May 23, 1933.   R. P. BALLOU   1,910,515

ELECTRICALLY TUNED DIFFERENTIAL FILTER

Filed Aug. 21, 1931

INVENTOR:
R. P. Ballou,
BY A. R. Vincill
His ATTORNEY

Patented May 23, 1933

1,910,515

UNITED STATES PATENT OFFICE

RICHARD P. BALLOU, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA

ELECTRICALLY TUNED DIFFERENTIAL FILTER

Application filed August 21, 1931. Serial No. 558,450.

My present invention relates to an improved filtering circuit adapted to transmit current of a predetermined frequency and to block currents of frequencies differing only slightly from that selected for transmission. The improved circuit is particularly adapted for use in the transmission of signals or the like where response of a relay to a predetermined frequency only is desired. With suitable choice of elements the circuit can be so designed as to block frequencies differing by only one or two per cent from that of the current transmitted.

Figure 1:
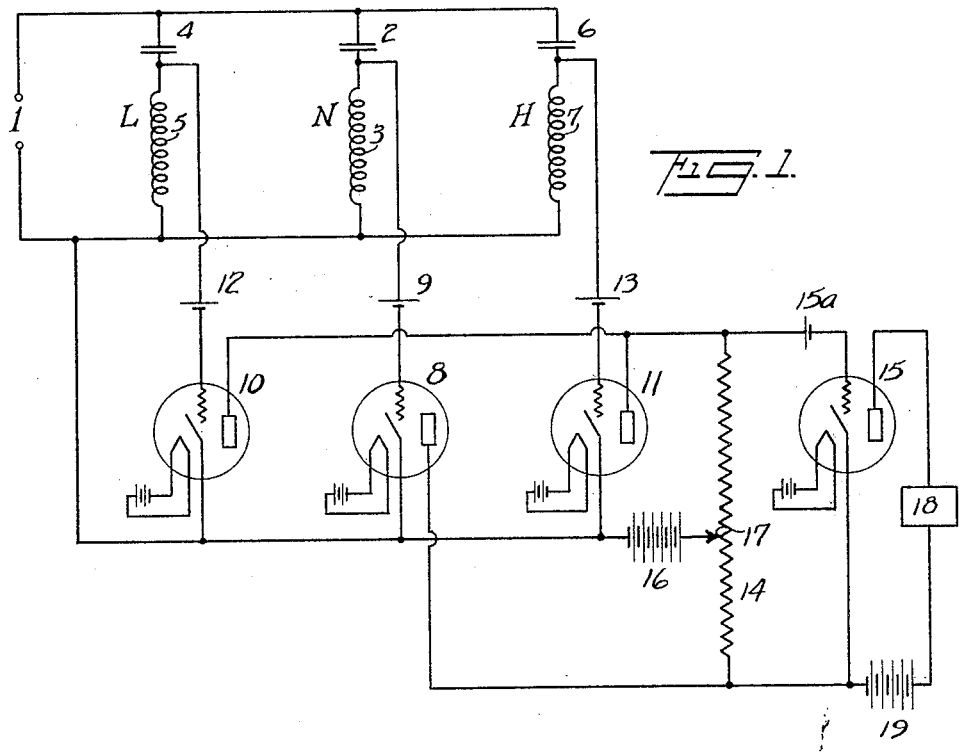
Figure 2:
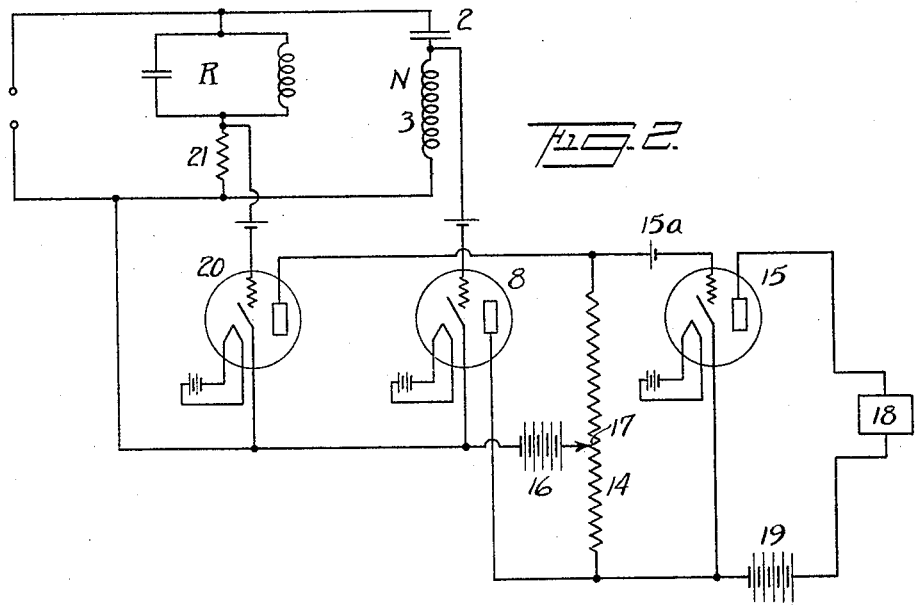

For an understanding of the invention reference may be had to the accompanying drawing of which, Fig. 1 illustrates diagrammatically a combination tuned electrical and differential vacuum tube circuit for transmission of current of a predetermined frequency only and, Fig. 2 illustrates a modified and simpler form of the circuit of Fig. 1.

In Fig. 1 three tuned circuits, L, N and H are connected in parallel across input terminals 1. Circuit N, comprising the capacity 2 and inductance 3 is tuned to the frequency which is to be transmitted. Circuit L comprising capacity 4 and inductance 5 is tuned to a frequency slightly lower than that to be transmitted and circuit H, comprising the capacity 6 and inductance 7 is tuned to a frequency slightly higher than that to be transmitted. For example, if circuit N is tuned to 500 cycles, circuit L may be tuned to 490 and circuit H to 510 cycles. The potential across the inductance 3 caused by current of the desired frequency flowing through circuit N is impressed upon the grid of a tube 8; suitable grid bias 9 being inserted in the lead connecting the grid of tube 8 with circuit N between the capacity 2 and inductance 3. Similarly the potential differences across the inductances 5 and 7 are impressed upon the grids of tubes 10 and 11 respectively; grid biasing batteries 12 and 13 being inserted in the respective grid leads to tubes 10 and 11 and the cathodes of each of tubes 8, 10 and 11 being connected to the common lead to inductances 3, 5 and 7. The anodes of tubes 10 and 11 are both connected to one end of a resistance 14 and, through grid biasing battery 15$^a$, with the grid of a tube 15. The anode of tube 8 is connected to the other end of resistance 14 and to the cathode of the tube 15. The cathodes of all three tubes 8, 10 and 11 are connected to the negative terminal of a plate battery 16, to the positive terminal of which is connected a contact 17 slidable along resistance 14.

The output circuit of tube 15 is indicated as including a device 18 connected between the plate of tube 15 and the positive terminal of a battery 19, the negative terminal of which is connected to the cathode of tube 15. Device 18 may be considered as any load device, such as a relay or other signal or it may be considered as a coupling to a succeeding amplifier.

With the above described circuit, if an electromotive force of a frequency to which the circuit N is tuned is impressed upon the input terminals 1, a relatively large alternating current will flow through inductance 3 and relatively small alternating currents will flow through inductances 5 and 7. During part of each cycle the potential applied to tube 8 will be positive and will cause current to flow through that part of resistance 14 which is in the plate circuit of that tube. The direction of current flow in resistance 14 being from contact 17 through the lower portion of resistance 14 will tend to apply a positive potential to the grid of tube 15 or to decrease the negative bias introduced by battery 15$^a$. The small currents passing through circuits L and H will similarly, during part of each cycle, cause currents to flow through the plate circuits of tubes 10 and 11, but the current flow through resistance 14 due to operation of tubes 10 and 11 will be from contact 17 through the upper portion of resistance 14; a direction opposite to that of the current due to operation of tube 8. As the plate current of tube 8 will be relatively large as compared with the plate currents of tubes 10 and 11, the overall potential applied between the cathode of tube 15 and grid bias 15$^a$ will swing positive during reception by the input circuit of current having the frequency to which circuit N is tuned. If however, the input frequency is slightly lower or higher than that to which circuit N is tuned, a relatively large current will flow through inductance 5 or 7 respectively with a correspondingly large resultant plate current in tube 10 or 11 and a correspondingly smaller resultant plate current in tube 8. The negative potential impressed upon the grid of tube 15 will thereupon be increased and no current or only a very small current will flow in the output circuit thereof. Thus with the output connected either directly, or through a suitable amplifier with a relay, operation of the relay may be effected only when the input frequency of the circuit is that to which circuit N is tuned; no operation of the relay occurring at slightly lower or higher frequencies. To prevent interferences with frequencies very much lower or higher than that desired a simple band pass filter could be inserted in the input circuit if desired.

In Fig. 2, instead of the tuned circuits L and H and the associated tubes 10 and 11, a single tube 20 having its input terminals connected across a resistance 21 in series with a simple parallel resonant circuit R is employed. The circuit R is tuned to resonate at the frequency to which the circuit N is tuned. When the impressed voltage is of the frequency to which the circuits R and N are tuned a maximum current flows through the inductance 3 and a minimum current flows through the resistance 21. With a different frequency of the input voltage a greater current flows through resistance 21 and a smaller current flows through inductance 3. Thus, the tube 15 will be operated only when the input frequency is that desired as it is only at that time that the voltage impressed upon the grid of tube 15 by current in resistance 14 is positive. At any other frequency the plate current of tube 20 exceeds that of tube 8 and thus prevents application of positive potential to the grid of tube 15.

With the circuit of either Fig. 1 or Fig. 2 the range of operation of tube 15 will depend upon the sensitivity of this tube and its associated apparatus, which may be somewhat controlled by the grid bias 15ᵃ; upon the position of contact 17 along resistance 14; upon the respective grid biases of the other tubes; and upon the frequencies to which the branches in the input circuits are tuned and the sharpness of their curves as determined by the resistances of their inductance coils.

In either circuit the response can be made independent of the phase relations by the addition of an inductive capacitive circuit having a suitable time constant in the grid leads of tubes 8, 10 and 11 (Fig. 1), or of tubes 8 and 20 (Fig. 2). Furthermore, in either circuit the response can be made independent of the phase relations if device 18 is a relay which will operate on an increase in average plate current in tube 15, the tube being biased by a battery 15ᵃ to operate over a linear portion of its mutual characteristic (as a class A amplifier).

In either circuit, tube 15 and the elements associated therewith can be omitted, and a polarized relay substituted therefor.

The preferred embodiment of the invention, together with a modification of a portion thereof, has now been described. Obviously various changes could be made and various refinements could be added without departing from the inventive concept which broadly may be described as the combination with parallel tuned circuits, of which at least one is tuned to the frequency to be transmitted, of a differential tube circuit including a resistance or inductance the direction of potential difference thereacross depending upon the relative magnitudes of the currents in the tuned circuits, whereby a potential difference across the resistance in a predetermined direction may be utilized to indicate reception of the desired frequency. The described circuits, while not suitable for use when two or more interfering signals of slightly different frequencies are simultaneously received, may be advantageously employed to select between successive signals of different frequencies and when so used distinguish with a nicety between frequencies differing by only a few per cent.

Although I have herein shown and described only two forms of apparatus embodying my invention, it is understood that various changes and modifications may be made therein within the scope of the appended claims without departing from the spirit and scope of my invention.

Having thus described my invention, what I claim is:

1. In an electrical filter, an input circuit, a differential circuit and an output circuit, said input circuit including branches having elements therein so selected relative to the frequency to be transmitted as to have the current in one branch a maximum when voltage of the desired frequency is impressed upon the circuit, a resistance in said differential circuit, a plurality of devices in said differential circuit so connected with the branches of said input circuit and with said resistance as to cause the potential difference across said resistance to be in one direction when the current in the first-mentioned branch of the input circuit is a maximum and to cause the potential difference across said resistance to be in the opposite direction when the ratio of the current in another branch of the input circuit to that in said first-mentioned branch exceeds a predetermined value due to a departure of the frequency of the impressed voltage from the desired value, said output circuit including a device adapted to operate only when the potential difference across said resistance is in the direction corresponding to maximum current in said first-mentioned branch.

2. The combination according to claim 1 wherein said device in the output circuit is a thermionic valve having its control grid connected to one end of said resistance and its cathode connected to the other end of said resistance and wherein means are provided for biasing the grid of said valve so that current is delivered by the output circuit only when the potential across said resistance exceeds a predetermined value.

3. In an electrical filtering circuit, a vacuum tube, means for impressing upon the control grid thereof a voltage which is a maximum when voltage of a predetermined frequency is impressed upon the circuit, a second vacuum tube, means for impressing upon the control grid thereof a voltage which increases as the frequency of the voltage impressed upon the circuit departs from the predetermined value, a resistance so connected with the output circuits of said tubes as to have the potential difference thereacross vary with the difference of the output currents of said tubes and a device connected with said resistance adapted to transmit current only when the potential difference across said resistance is in a direction corresponding to maximum voltage impressed upon said first mentioned tube.

4. An electrical filter comprising in combination three parallel branches one tuned to the frequency to be transmitted and the others tuned to lower and higher frequencies respectively, a resistance, means associated with said branches and with said resistance for creating a potential difference across said resistance varying as the difference of the currents through the branch tuned to the frequency to be transmitted and through said other branches, and a device responsive to the potential difference across said resistance adapted to transmit current only when the potential difference across said resistance is in a direction corresponding to maximum current through the branch tuned to the frequency to be transmitted.

5. An electrical filter comprising in combination a branch circuit tuned to the frequency to be transmitted, a second branch circuit in parallel with said first branch, said second branch including a resistance in series with a circuit tuned to resonate at the desired frequency, a second resistance, means associated with said branch circuits and with said second resistance for creating a potential difference across said second resistance varying as the difference of the currents through said first branch and through the resistance of said second branch and a device responsive to the potential difference across said resistance adapted to transmit current only when the potential difference is in a direction corresponding to maximum current through said first branch.

6. An electrical filter for transmitting current of a predetermined frequency comprising in combination an input circuit having a plurality of parallel branches so tuned as to make the current through one branch a maximum when the voltage impressed thereupon has the desired frequency and to increase the current through another branch as the frequency departs from the desired value, a differential tube circuit connected with said input circuit and having a plurality of vacuum tubes and a resistance therein connected with the plate circuits of said tubes, and an output circuit so connected with said resistance as to be energized only when the potential difference across said resistance due to the difference of the currents in the plate circuits of said tubes is in a predetermined direction, said tubes being so connected with said branches of the input circuit and with said resistance as to cause a potential difference thereacross in the predetermined direction only when the maximum current flows through the first mentioned branch of the input circuit.

7. An electrical filter comprising in combination an input circuit having three parallel branches, one tuned to the frequency the filter is to transmit, one tuned to a lower frequency, and the other tuned to a higher frequency, a differential circuit including three vacuum tubes having their cathodes connected to a common lead to said branches, one having its control grid connected to the circuit tuned to the frequency to be desired so as to have impressed thereon a voltage varying directly with the current through that branch, the other two tubes having their control grids respectively connected with the branches tuned to the lower and higher frequencies, a resistance in said differential circuit having one terminal connected to the plate of the first-mentioned tube and its other terminal connected to the plates of said other tubes, a source of potential for said tubes having its negative terminal connected to the cathodes of said tubes and its positive terminal connected to a tap on said resistor, and a device in said output circuit adapted to transmit current only when the potential difference across said resistance is in a direction corresponding to maximum current in the branch tuned to the frequency to be transmitted.

8. An electrical filter according to claim 7 wherein said device in said output circuit is a thermionic valve having its cathode connected to the first-mentioned end of said resistance and its control grid connected to the other end of said resistance and wherein the grid bias of said valve is such that current is delivered by the output circuit only when the potential across said resistance exceeds a predetermined value.

9. The combination according to claim 7 wherein said means in said output circuit include a thermionic valve having its cathode connected to the first-mentioned end of said resistance and biased for operation upon the linear portion of its mutual characteristic and its control grid connected to the other end of said resistance and a relay connected to the plate of said valve and adapted to operate only upon an increase in the average direct current therethrough.

10. In an electrical filter for passing signals or the like of a predetermined frequency and for suppressing transmission of frequencies differing from that desired the combination comprising a plurality of parallel circuits, one so tuned as to have the current therethrough a maximum when the frequency impressed upon the filter is that to be transmitted and another so tuned as to have the current therethrough increase as the frequency departs from the desired value and means oppositely effected in response to the currents through said branches whereby said means may be utilized because transmission of a signal or the like when the ratio of the current in the first mentioned branch to that in the other branches exceeds a predetermined value.

In testimony whereof I affix my signature.

RICHARD P. BALLOU.